United States Patent [19]

Umekida et al.

[11] Patent Number: 5,249,093
[45] Date of Patent: Sep. 28, 1993

[54] MAGNETIC DISK

[75] Inventors: Masaru Umekida; Daisuke Mitsuhashi, both of Minamiashigara, Japan

[73] Assignee: Fuji Photo Film Co., Ltd., Kanagawa, Japan

[21] Appl. No.: 713,213

[22] Filed: Jun. 11, 1991

[30] Foreign Application Priority Data

Jun. 11, 1990 [JP] Japan .................. 2-149885

[51] Int. Cl.$^5$ .................................................. G11B 5/82
[52] U.S. Cl. ......................................... 360/135; 360/136
[58] Field of Search ........................ 360/131, 135, 136

[56] References Cited

U.S. PATENT DOCUMENTS

| | | | |
|---|---|---|---|
| 3,805,292 | 4/1974 | Hashiguchi et al. | 360/135 |
| 4,573,097 | 2/1986 | Pastor et al. | 360/135 |
| 4,598,017 | 7/1986 | Boyer et al. | 360/135 |
| 4,615,930 | 10/1986 | Matsumoto et al. | 360/136 |
| 4,800,458 | 1/1989 | Okita | 360/135 |
| 4,812,939 | 3/1989 | Oishi | 360/135 |
| 5,119,259 | 6/1992 | Kikuchi | 360/135 |

FOREIGN PATENT DOCUMENTS

| | | |
|---|---|---|
| 235629 | 2/1990 | Japan . |
| 249283 | 2/1990 | Japan . |

*Primary Examiner*—Bruce C. Anderson
*Attorney, Agent, or Firm*—Sughrue, Mion, Zinn, Macpeak & Seas

[57] ABSTRACT

A magnetic disk comprises an annular resilient magnetic recording mediumm, an outer ring having an outer affixing surface, and an annular frame disposed radially inwardly of the outer ring. The annular frame comprises an annular thrusting surface protruded axially for thrusting the recording medium to exert tension to it, an inner affixing surface inwardly affixed to the recording medium, and a base axially receded from the thrusting surface.

20 Claims, 3 Drawing Sheets

MAGNETIC DISK

FIELD OF THE INVENTION

This invention relates to a magnetic disk and the method for producing the disk. More particularly, it relates to a magnetic disk suited as, for example, a magnetic disk for streched surface recording (SSR), that is a magnetic disk comprised of a disk substrate and a magnetic sheet extended over and affixed to the disk substrate, and the method for producing such magnetic disk.

BACKGROUND

There has hitherto been proposed a magnetic disk for SSR of the type in which a magnetic recording medium formed of a resilient material is used as the magnetic recording medium.

The conventional magnetic disk for SSR and the method for producing the disk have been disclosed in the JP Patent KOKAI Publication No. 2-49283 and JP Patent KOKAI Publication No. 2-35629 (1990). In the case of a magnetic disk disclosed in the JP Patent KOKAI Publication No. 2-35629, shown herein in FIG. 5 as a perspective view and in FIG. 6 as a cross-sectional view, the magnetic disk for SSR, shown in general by a reference numeral 100, is constituted by resilient annular magnetic recording media 101, 101' and an annular supporting frame 102. The supporting frame 102 has an annular outer ridge or outer rib 105 on its radially outer edge, an annular inner ridge or inner rib 106 on its radially inner edge and a base 107 interconnecting the outer and the inner ribs and providing upper and lower annular recessed surfaces. The recording media 101, 101', in the form of sheets, are stretched and affixed to the supporting frame 102 so as to cover the ranges of the annular recesses 108 delimited between the outer rib 105 and the inner rib 106.

For producing the magnetic disk for SSR 100, a force as uniform as possible is applicable to the sheet-shaped recording media 101, 101' as a tensile force from the radially outer side thereof and, while the tensile force is maintained, the radially outer and inner edges of the media are secured to the outer rib 105 and the inner rib 106 with the aid of an adhesive.

DISCUSSION OF THE RELATED ART

With the above described conventional magnetic disk for SSR, the step of drawing or stretching the sheet-shaped recording media 101, 101' from the radially outer sides and the step of bonding the thus stretched media 101, 101' to the outer rib 105 and the inner rib 106 of the annular supporting frame 102 with the aid of an adhesive, need to be carried out simultaneously.

However, if these two steps are carried out simultaneously, the tensile force may be accidentally lowered before curing of the adhesive in the course of the bonding step. in such case, the uniform tensile force cannot be maintained in the completed disk, which means a considerable hindrance to subsequent recording and/or reproduction which is performed with the aid of a magnetic head. Thus it becomes extremely difficult to maintain a uniform tension for producing magnetic disks in large quantities and with uniform properties.

On the other hand, it is by no means easy to apply a uniformly radially directed tensile force to the magnetic recording medium from the radially outer side of the recording medium during production of the recording medium, such that a large-sized apparatus is necessitated with increased production costs.

SUMMARY OF THE DISCLOSURE

In view of the above described status of the art, it is an object of the present invention to provide a magnetic disk suitable as a magnetic disk for SSR in which the tensile force applied to the disk during production may be easily rendered uniform, and in which the uniform tensile force may be maintained even after completion of the magnetic disk.

It is another object of the present invention to provide a magnetic disk suitable as a magnetic disc for SSR which may be produced at lower production costs.

It is yet another object of the present invention to provide a method for producing such magnetic disk.

In one aspect, the present invention provides a magnetic disk comprising an annular resilient magnetic recording medium having a recording surface for magnetic recording, an outer ring having an outer affixing surface for being affixed to said recording medium at a radially outer periphery of said recording medium, and an annular frame disposed radially inwardly of said outer ring and on the side opposite to the recording surface of said recording medium, said annular frame comprising an annular thrusting surface protruded axially towards said recording surface beyond said outer affixing surface for thrusting said recording medium towards said recording surface to exert a tension to said recording medium; an inner affixing surface disposed radially inwardly of said thrusting surface and affixed to said recording medium at a radially inner periphery of said recording medium; and a base axially receded from said thrusting surface and adapted to integrally interconnect said thrusting surface and said inner affixing surface.

In another aspect, the present invention also provides a method for producing a magnetic disk comprising the steps of affixing a recording medium for magnetic recording to an annular outer ring within a range of an outer affixing surface of said outer ring, axially thrusting said recording medium by an annular thrusting surface of an annular frame at the radially inner side of said outer ring from the sick of said recording medium affixed to said outer ring in the direction of a recording surface of said recording medium, for mounting said recording medium under tension on said annular frame, and affixing said recording medium to said frame to an inner affixing surface of said annular frame formed on the radially inner side of said thrusting surface.

With the magnetic disk according to the present invention, the recording medium affixed to the outer affixing surface of the outer ring at the radially outer edge thereof is stretched by being thrust axially by means of a thrusting surface of the annular frame and affixed at the radially inner edge thereof to the radially inner affixing surface of the anular frame. The magnetic disk may be produced by carrying out a step-by-step production process including the affixing step at the outer affixing surface of the outer ring, the stretching step by the thrusting surface of the annular frame and the final affixing step at the inner affixing surface of the annular frame. By the thrusting by the thrusting surface, the recording medium may be stretched under a uniform tension when being mounted on the annular frame, while there is no risk of loosening of the tension during the curing period in the course of the final affixing step.

Thus there is provided a magnetic disk suitable as a magnetic disk for SSR in which the recording medium has been stretched and tensioned under an appropriate tension during production and which may be produced in larger quantities and at reduced production costs.

With the method for producing process for the magnetic disk according to the present invention, by sequentially carrying out the affixing step of affixing the recording medium to the outer ring, the step of tensioning the recording medium by the thrusting surface of the annular frame during mounting of the recording medium on the annular frame and the second affixing step of affixing the recording medium on the affixing surface of the annular frame disposed radially inwardly of the thrusting surface, a uniform tension may be applied to the recording medium by the thrusting by the thrusting surface during attachment of the recording medium to the frame. By separately carrying out the affixing steps and the tensioning step, there is no longer the risk that the tension placed on the recording medium be loosened during the curing period of the second or final affixing step to produce a nonuniform tension in the ultimate product, or that wrinkles be formed in the recording medium. Thus there is provided the magnetic disk of uniform quality suitable as the magnetic disk for SSR, while there is also provided a method for producing a magnetic disk for which no larger production equipment is necessitated and in which the tension placed on the recording medium may be controlled easily throughout the production steps.

DESCRIPTION OF PREFERRED EMBODIMENTS

Figure 1:
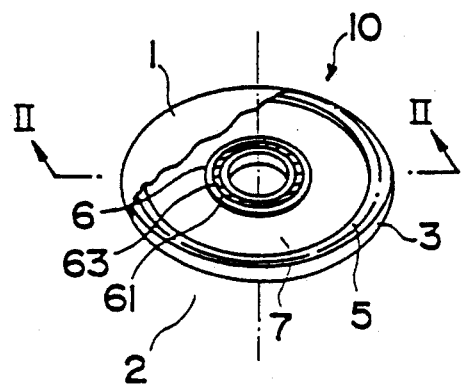
FIG. 1 is a perspective view showing a magnetic disk for SSR according to a preferred embodiment of the present invention, with a portion of the magnetic recording medium being removd.
Figure 2:
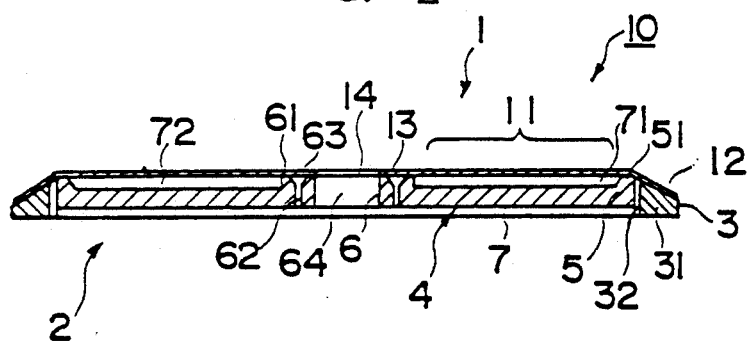
FIG. 2 is a longitudinal cross-sectional view showing the magnetic disk for SSR shown in FIG. 1, taken along line II—II of FIG. 1.

A magnetic disk for SSR according to an embodiment of the present invention will be explained by refering to FIGS. 1 and 2. FIG. 1 is a perspective view showing a magnetic disk for SSR of the present embodiment, wherein the recording medium is partially removed for illustrating a disk-supporting frame 2 functioning as an infrastructure for the recording medium. FIG. 2 is a longitudinal cross-sectional view taken along line II—II of FIG. 1.

Referring to FIGS. 1 and 2, a magnetic sheet as the magnetic recording medium 1 is first placed under tension on a disk-supporting frame 2. The sheet is affixed by an adhesive to an outer affixing surface 31 of a threaded outer ring 3, disposed radially outside of the sheet, and to an inner affixing surface 61 of an inner rib 6 integrally constituting the inner periphery of an annular frame 4 which is threadedly connected to the outer ring 3. The outer ring 3 and the annular frame 4 make up the disk-supporting frame 2. The magnetic sheet 1 thus attached to the disk-supporting frame 2 is thrust by a thrusting surface 51 of an outer rib 5 constituting the outer periphery of the annular frame 4 in the direction towards the recording surface of the magnetic sheet, that is, upwards in FIG. 2.

Referring to FIG. 2, the magnetic recording medium 1 has a recording region 11 disposed between the outer rib 5 and the inner rib 6. The outer and inner ribs 5 and 6 are connected to each other integrally by a base 7 to constitute the annular frame 4. The base 7 has a recessed or concave surface 71 directed to the surface opposite to the recording surface of the recording region 11 of the recording medium 1.

The threaded ring 3 is formed on its axial end face with a chamfered section 31 acting as the aforementioned outer affixing surface for attachment to the magnetic recording medium, and has an inner peripheral surface formed in its entirety as a threaded surface 32 extending along the disk axis. The threaded ring 3 is affixed at the chamfered section 31 to an outer periphery 12 of the recording medium 1 which extends radially outwardly of the recording region 11 and which constitutes the radially outer periphery of the recording medium 1.

The annular frame 4, constituted by the outer rib 5, the inner rib 6 and the base 7, is connected to the threaded inner surface 32 of the threaded ring 3 threadedly engaged with the radially outward threaded surface of the outer rib 5. The mating threaded surfaces are bonded and affixed to each other by an adhesive for preventing slackening of the magnetic recording medium 1 which has once been stretched under a predetermined tension by the thrusting suface 51 of the outer rib 5. In the affixed state, the outer rib 5 and the inner rib 6 are projected slightly towards the recording medium beyond the axial end of the chamfered section 31 of the outer ring 3. The recording medium 1 is mountd under tension by being thrust towards the recording surface by the thrusting surface 51 of the outer rib 5 between the inner affixing surface 61 of the inner rib 6 and the outer affixing surface 31 of the outer ring 3.

The inner rib 6 is formed with a number of axially extending equiangularly disposed axial slots (or bores) 62 adapted for adhesive application, and an annular slot 63 disposed at the center of the slots 62 radially inwardly of the affixing surface 61. The axial slots 62 are opened into and communicate with one another by the annular slot 63. The magnetic recording medium 1 has a radially inner periphery 13 affixed to the inner affixing surface of the inner rib 6 within the range of the annular slot 63.

The surface of the base 7 interconnecting the outer rib 5 and the inner rib 6 directed to the recording medium 1 is formed as a recessed surface 71, and an inner space 72, defined by the recessed surface 71 and the recording medium 1, is formed on the side of the recording medium opposite to the recording surface of the recording region 11. Although not shown, air-vent slots are formed in the base 7 for compensating air expansion within the inner space 72 with rise in ambient temperature.

The inner rib 6 is formed with a central axial bore 64 in register with a central aperture 14 in the annular recording medium 1 for receiving a driving hub, not shown, functioning as a driving axle. The present magnetic disk 10 is rotated by the driving hub at, for example, 3600 rpm. The magnetic disk 10 faces a magnetic head, not shown, within the annula-recording region 11 delimited by the outer rib 5 and the inner rib 6 and recording signals may be recorded on or reproduced from the recording medium by means of the magnetic head.

As an example of the magnetic sheet as the annular recording medium of the present invention, it may be constituted by a magnetic film of a suitable magnetic metal material, such as cobalt or chrome, formed on a polyimide film, as a substrate, such as by vacuum deposition, sputtering or coating.

The threaded ring 3 and the annular frame 4 constituting the disk-supporting frame 2 may be formed of a metallic material, such as aluminum, plastics or FRP resin as a composite material. The adhesive used for bonding the recording medium to the supporting frame may include for example an epoxy resin adhesive and a UV curable resin adhesive.

Figure 3:
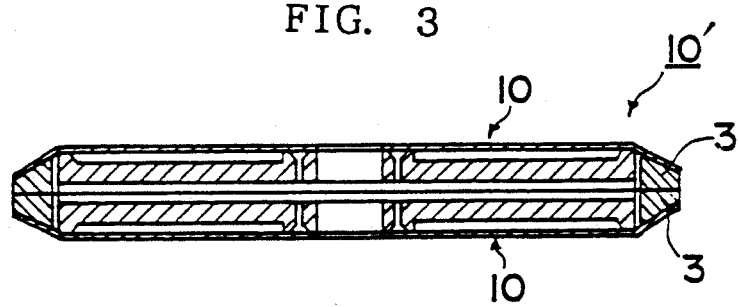
FIG. 3 is a longitudinal cross-sectional view similar to FIG. 2 and showing a magnetic disk for SSR according to a modification of the present invention.

In FIG. 3, there is shown, in a longitudinal cross-sectional view similar to FIG. 2, a double-sided magnetic disk 10' according to a modified embodiment of the present invention, in which two magnetic disks 10, each having a one-side recording region as shown in FIG. 2, are bonded together at the back sides of two similar threaded rings 3. In this manner, both the single-sided and double-sided magnetic disks may be provided in accordance with the present invention.

Figure 4:
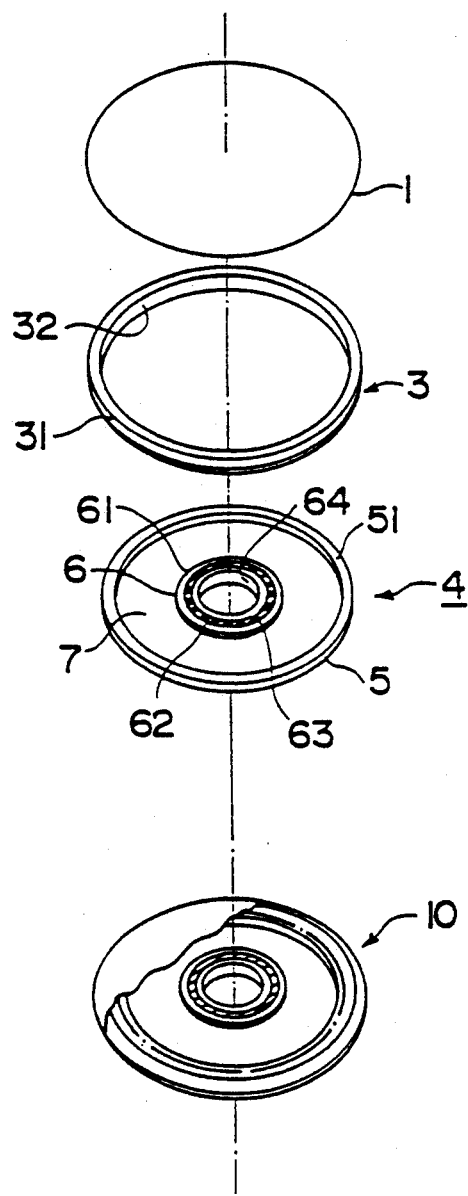
FIG. 4 is an exploded view showing the method for producing a magnetic disk for SSR embodying the present invention, step by step.
Figure 5:
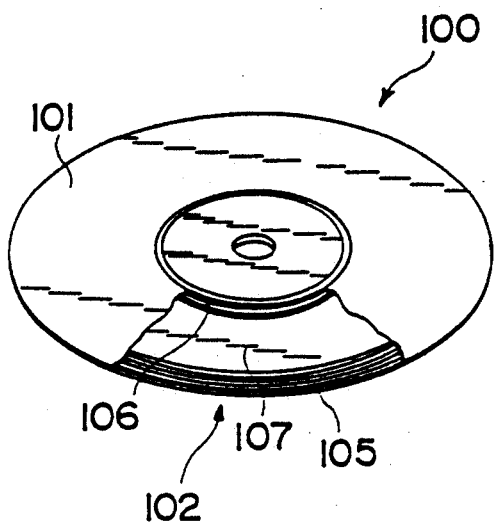
FIG. 5 is a perspective view showing a conventional magnetic disk for SSR.
Figure 6:
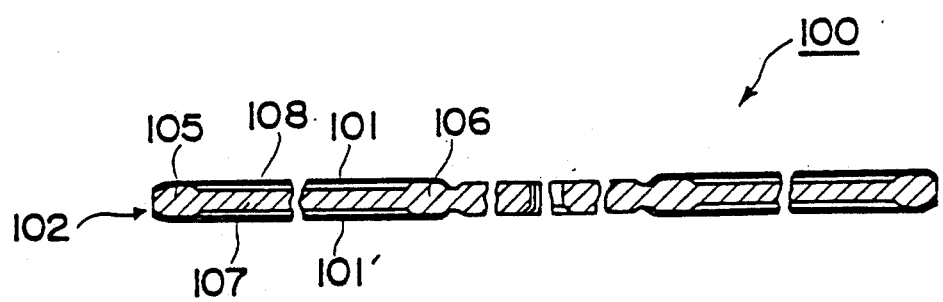
FIG. 6 is longitudinal cross-sectional view showing the magnetic disk for SSR shown in FIG. 5, taken along the disk axis.

FIG. 4 illustrates the method for producing the magnetic disk for SSR embodying the present invention. In this figure, the step-by-step production process for the magnetic disk 10 is shown as an exploded view showing respective components of the magnetic disk.

The magnetic sheet 1, formed as a polyimide film, which has been punched to a circular shape and which has a magnetic layer and a protective layer etc., for example, formed thereon, is bonded to the chamfered section 31 of the outer ring 3, the entire inner peripheral surface of which is previously formed as the threaded surface 32. The sheet 1 is maintained in this state until complete curing of the adhesive. Even though the magnetic sheet 1 needs to be affixed uniformly to the threaded ring 3 to prevent creasing, there is no necessity for tensioning or stretching the sheet 1 under a large radial tension. The aforementioned punching step may be performed before or after the affixing step.

The annular frame 4, constituted by the outer rib 5 and the inner rib 6 interconnected by the base 7, is threadedly attached to the inner threaded surface 32 of the threaded ring 3 at the outer rib 5. After having been threadedly engaged with the threaded ring 3, the annular frame 4 is further threaded until it is axially protruded beyond the chamfered section 31 of the threaded ring 3 functioning as the outer affixing surface. In this manner, the magnetic sheet 1 is thrust axially towards its recording side by the thrusting surface 51 of the outer rib 5 and the forward end face, that is the inner affixing surface 61, of the inner rib 6. Thus the magnet sheet 1 is gradually tensioned or stretched under the thrusting force exerted by the threading of the annular frame 4 between the inner affixing surface 61 of the inner rib 6 and the outer affixing surface 31 of the outer rib 3. The threading movement of the annular frame 4 is continued until the tension acting on the film surface reaches a predetermined value. Accurate tension control may be made by measuring the value of tension during the production process.

The threading of the annular frame 4 is terminated when the sheet 1 has been mounted under a predetermined tension. The adhesive is then injected into the axial slots in the inner rib 6 from the open sides thereof opposite to the magnetic sheet 1. The adhesive is allowed to circumferentially flow uniformly in the annular slot 63 formed on the forward end face 61 of the inner rib 6, so that the magnetic sheet 1 is affixed to the inner rib 6 within the range of the annular slot 63. The forward end face 61 of the inner rib 6 is formed on the same horizontal plane as or axially receded by a small distance from the thrusting surface 51 of the outer rib 5. Even though the thrusting force is not exerted by the forward end face 61 of the inner rib 6 in the case where the end face 61 is receded in this manner from the plane of the thrusting surface 51, the forward end face 61 is affixed ultimately to the recording medium 1 by the adhesive.

After curing of the adhesive, the portion of the magnetic sheet overlying the axial aperture 64 of the inner hub 6 is punched off along its inner periphery. By the punching operation, the magnetic sheet 1 is formed as an annular recording medium to complete a single-sided magnetic disk. The magnetic disk 10 may then be affixed to another similarly produced single-sided magnetic disk 10 back to back at the back sides of the outer ribs 3 of the disks to produce the double-sided magnetic disk 10'.

The magnetic layer and/or the protective layer may be formed on the sheet per se or on the sheet built into a completed magnetic disk 10.

With the above described embodiment, it is preferred that a protective layer and a lubricating layer, not shown, be previously formed on the side of the magnetic sheet 1 opposite to its recording surface. In this manner, there may be provided a magnetic disk in which a rotational force due to friction is not exerted to the sheet from the thrusting surface of the outer rib or from the forward end face of the inner rib, even during rotation of the annular frame, and in which the film surface of the sheet is not distorted after completion of the magnetic disk.

It is preferred that the base 7 interconnecting the outer rib 5 and the inner rib 6 be formed as an annular disk. However, since it suffices if the outer rib 5 and the inner rib 6 are connected integrally to each other, the base (connecting member) may also be formed as ribs or spokes.

In the above described embodiments of the present invention, the inner periphery of the outer ring is formed as the threaded surface, and the annular frame is engaged at the threaded surface for axially thrusting the recording medium. However, the present invention is not limited to this specific construction. For example, the threaded surface may be formed on the outer peripheral surface of the outer ring (with the outer periphery of the annular frame being modified correspondingly so as to be adapted to receive it), or the outer periphery of the outer ring is not formed as the threaded surface but the outer ring and the annular frame may be simply engaged with each other by a slide fitting. The outer ring and the annular frame may also be engaged with each other by spirally extending engaging surfaces (thrust exerting surfaces) formed on the outer ring and the annular frame, in which case the annular frame is first thrust towards the recording medium by rotating relative to the outer ring, and the annular frame and the outer ring are integrally connected to each other so as to be engaged at the spirally extending surfaces. Even in such case, the tension exerted to the recording medium may be maintained at a predetermined value more easily than with the conventional method in which a radial tension need to be exerted continuously during curing.

It should be noted that modifications in the art may be done without departing from the gist and scope of the present invention as herein disclosed and claimed hereinbelow.

What is claimed is:

1. A magnetic disk, comprising:
an annular resilient magnetic recording medium having a recording surface for magnetic recording;
an outer ring having an outer affixing surface to which said recording medium is affixed at a radially outer periphery of said recording medium; and
an annular frame disposed radially inwardly of said outer ring and on the side opposite to the recording surface of said recording medium, said annular frame being movable in an axial direction with respect to said outer ring and including an annular thrusting surface protruded axially towards said recording surface, an inner affixing surface disposed radially inwardly of said thrusting surface and affixed to said recording medium at a radially inner periphery of said recording medium and a base axially receded from said thrusting surface for integrally interconnecting said thrust surface and said inner affixing surface, wherein movement of said frame in said axial direction toward said recording medium to an extent where said thrusting surface extends beyond said outer affixing surface causes said thrusting surface to push against said recording medium so as to apply tension thereto.

2. A magnetic disk as defined in claim 1 wherein said inner affixing surface is flush with or slightly receded from the thrusting surface.

3. A magnetic disk as defined in claim 1 wherein said affixing surface is formed on an inner rib which constittes a central part of the annular frame.

4. A magnetic disk as defined in claim 3 wherein said affixing surface comprises slot means for receiving an adhesive.

5. A magnetic disk as defined in claim 4 wherein said slot means is an annular slot.

6. A magnetic disk as defined in claim 4 wherein said slot means is connected to at least one axial slot extending to a back side of said annular frame.

7. A magnetic disk as defined in claim 1 wherein said outer affixing surface of the outer ring is formed of a chamfered surface.

8. A magnetic disk as defined in claim 1 wherein said base of the annular frame is formed of a connecting member selected from the group consisting of a disc, ribs and spokes.

9. A magnetic disk as defined in claim 1 wherein said outer ring and said annular frame are connected to each other by spirally extending engaging surfaces formed between the outer ring and the annular frame, the spirally extending engaging surfaces allowing thrusting through relative rotation between the outer ring and the annular frame.

10. A magnetic disk as defined in claim 1 wherein said annular recording medium is with its outer periphery secured to the outer ring while with its inner periphery secured to the inner affixing surface of the annular frame.

11. A magnetic disk as defined in claim 1 which further comprises means for exerting thrust to the annular frame through rotation of said annular frame relative to said outer ring.

12. A magnetic disk as defined in claim 1 wherein the magnetic disk comprises two of combinations of the annular recording medium, the outer ring and the annular frame, said two combinations being connected to each other back to back to form a dourble-sided magnetic disk.

13. A magnetic disk as defined in claim 1, wherein said annular frame is secured to the outer ring after application of said tension.

14. A magnetic disk, comprising:
an annular resilient magnetic recording medium having a recording surface for magnetic recording;
an outer ring having an outer affixing surface to which said recording medium is affixed at a radially outer periphery of said recording medium; and
an annular frame disposed radially inwardly of said outer ring and on the side opposite to the recording surface of said recording medium, said annular frame comprising an annular thrusting surface protruded axially towards said recording surface beyond said outer affixing surface for thrusting said recording medium towards said recording surface to exert a tension to said recording medium, an inner affixing surface disposed radially inwardly of said thrusting surface and affixed to said recording medium at a radially inner periphery of said recording medium and a base axially receded from said thrusting surface for integrally interconnecting said thrust surface and said inner affixing surface, wherein said outer ring and said annular frame are threadedly connected to each other.

15. A magnetic disk as defined in claim 14 wherein said outer ring and said annular frame are connected to each other through a thread formed between an inner periphery of the outer ring and an outer periphery of the annular frame.

16. A magnetic disk as defined in claim 14 wherein said outer ring and said annular frame are threadedly connected to each other through a thread formed between an outer peripheral surface of the outer ring and a corresponding surface formed on the annular frame.

17. A magnetic disk comprising:
an annular resilient magnetic recording medium having a recording surface for magnetic recording,
an outer ring having an outer affixing surface for being affixed to said recording medium at a radially outer periphery of said recording medium,
an annular frame disposed radially inwardly of said outer ring and on the side opposite to the recording surface of said recording medium, and
means for exerting thrust force to the annular recording medium to provide tension force in the annular recording medium by moving said annular frame axially with respect to said outer ring,
said annular recording medium being with its outer periphery secured to the outer ring while with its inner periphery secured to an inner periphery of the annular frame.

18. A magnetic disk as defined in claim 17 wherein said means for exerting thrust force comprises means for exerting thrust to the annular frame through rotation of said annular frame relative to said outer ring thereby exerting said thrust force to the annular recording medium.

19. A magnetic disk, comprising:
an annular resilient magnetic recording medium having a recording surface for magnetic recording;
an outer ring having an outer affixing surface to which said recording medium is affixed at a radially outer periphery of said recording medium; and
an annular frame disposed radially inwardly of said outer ring and on the side opposite to the recording surface of said recording medium, said annular frame being movable in an axial direction with respect to said outer ring so as to urge against said recording medium and apply tension thereto.

20. A magnetic disk as defined in claim 19, wherein said annular frame is secured to the outer ring after application of said tension.

* * * * *